(12) United States Patent
Tkachov

(10) Patent No.: US 11,178,198 B1
(45) Date of Patent: Nov. 16, 2021

(54) BUFFERING DATA ON HIGH BANDWIDTH NETWORKS

(71) Applicant: Disney Enterprises, Inc., Burbank, CA (US)

(72) Inventor: Nikita I. Tkachov, Elmsford, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/089,317

(22) Filed: Nov. 4, 2020

(51) Int. Cl.
*H04L 29/06* (2006.01)
*H04L 12/861* (2013.01)
*H04L 29/08* (2006.01)

(52) U.S. Cl.
CPC .......... *H04L 65/4069* (2013.01); *H04L 49/90* (2013.01); *H04L 65/80* (2013.01); *H04L 67/2842* (2013.01)

(58) Field of Classification Search
CPC .. H04L 65/4069–65/4092; H04L 65/80; H04L 49/90–49/9094; H04L 67/2842–67/2852
See application file for complete search history.

(56) References Cited

U.S. PATENT DOCUMENTS

| | | | |
|---|---|---|---|
| 2002/0194609 A1* | 12/2002 | Tran | H04N 21/44209 725/95 |
| 2012/0297081 A1* | 11/2012 | Karlsson | H04L 65/60 709/231 |
| 2013/0019033 A1* | 1/2013 | Shima | H04N 1/32593 710/34 |
| 2014/0089469 A1* | 3/2014 | Ramamurthy | H04N 21/2402 709/219 |
| 2014/0143431 A1* | 5/2014 | Watson | H04L 65/4084 709/227 |
| 2019/0045399 A1* | 2/2019 | Bongaarts | H04W 28/18 |
| 2020/0213372 A1* | 7/2020 | Chen | H04L 65/604 |
| 2021/0194951 A1* | 6/2021 | Dai | H04L 67/104 |

* cited by examiner

*Primary Examiner* — Clayton R Williams
(74) *Attorney, Agent, or Firm* — Patterson + Shendan, LLP

(57) ABSTRACT

Techniques for buffering data over high bandwidth networks are provided. A first portion of data is downloaded into a buffer at a first download speed. The first portion of data is outputted from the buffer. Upon determining that data is being downloaded at a second download speed greater than the first download speed, it is determined to use a cache for one or more subsequent portions of data, and a second portion of data is downloaded into the cache. Upon determining that the buffer is empty, the second portion of data is outputted from the cache.

20 Claims, 7 Drawing Sheets

BUFFERING DATA ON HIGH BANDWIDTH NETWORKS

BACKGROUND

Some systems download media in discrete segments. Each segment is then output sequentially. However, if the download speed changes substantially, a streaming device may select a non-optimal bitrate for the next segment(s). When intermittent and sporadic connections are lost, the next segment(s) may fail to download in time, causing buffering and dropouts in the media output.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
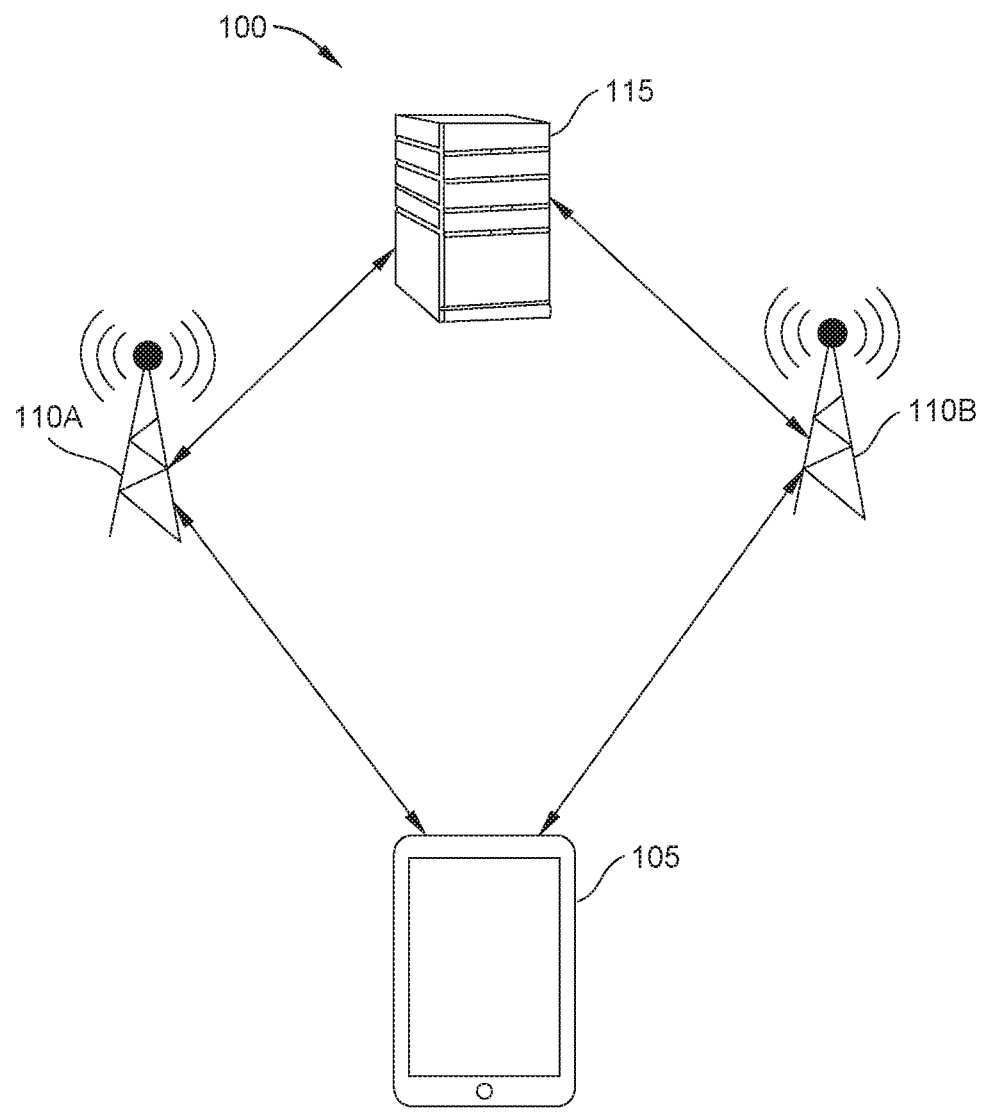
FIG. 1 depicts a system including a streaming device configured to adaptively buffer data over network connections with dynamic bandwidth, according to some embodiments disclosed herein.

In a variety of systems, data is downloaded and buffered into memory for immediate or subsequent output. For example, to stream video data, the video may be downloaded into a buffer in memory, and output for display from the buffer. Using a buffer allows the system to pre-download some data before it is output, in order to prevent stutters or pauses in the output. For example, some systems download media in discrete segments, storing each segment in the buffer. Each segment is then output sequentially from the buffer.

Some systems utilize adaptive bitrate solutions to improve the streaming process. In such systems, the streaming platform offers the stream at a variety of bitrates (e.g., ten megabits per second, fifteen megabits per second, and the like). The streaming device can then select which bitrate to download based on its own network conditions. For example, the streaming device can measure the speed at which the video file is being downloaded in order to determine the appropriate bitrate to request when downloading the next portion of the video.

However, if the download speed changes substantially, the streaming device may select a non-optimal bitrate for the next segment(s). For example, the device may ordinarily utilize a first network connection for downloading the media, but receive intermittent connectivity with much higher speeds. If these higher speeds are used to select the next bitrate, the device will select a higher bitrate that cannot be sustained on the original connection speed.

Embodiments of the present disclosure provide systems, devices, and methods to respond to dynamic and shifting connectivity in order to improve the operations of devices using the dynamic networks to download or upload data. In the present disclosure, media streaming is used in some examples. However, it is to be understood that embodiments of the present disclosure are readily applicable to a wide variety of uses involving download or uploading data.

In some embodiments, computing devices can download (or upload) data using a network connection at some initial speed. When increased bandwidth is available (on the same connection or on a second network connection), the devices can utilize this burst of speed to download (or upload) additional data beyond that which it otherwise would in the timeframe. In one embodiment, if the device was utilizing some initial bitrate, quality, or other indicator of the amount of data being downloaded or uploaded, the device continues to use the same bitrate in order to ensure the process is uninterrupted when the higher speed connection is on longer available.

For example, mobile devices may utilize 4G connections to download segments of media in a streaming environment. The device can select which bitrate to stream based on the speed (also referred to as bandwidth) of the 4G connection. Increasingly, higher-speed networks (such as millimeter 5G) have been deployed. These networks often provide very high bandwidth, but with sporadic and intermittent connectivity. For example, millimeter 5G connections often require line of sight to the tower, which causes this high-bandwidth connection to be unstable and temporary. Thus, this higher-speed connectivity should not be utilized in determining which bitrate to request for subsequent segments. Further, as the memory buffer is often fairly limited, the high-speed connection may be wasted because the buffer will fill very quickly.

In embodiments of the present disclosure, streaming devices can take advantage of this intermittent connectivity by allocating a separate cache or by temporarily increasing the size of the buffer in order to allow additional data to be downloaded using the high speed connection. This allows the device to take advantage of intermittent high-speed connectivity, which reduces interruptions to the stream and improves the operation of the overall streaming system.

FIG. 1 depicts a system 100 including a Streaming Device 105 configured to adaptively buffer data over network connections with dynamic bandwidth, according to some embodiments disclosed herein. In the illustrated embodiment, a Streaming Device 105 is communicatively coupled with a Content Server 115 via one or more Networks 110A-110B. In an embodiment, the Networks 110 provide wireless connectivity. In at least one embodiment, the Streaming Device 105 is a mobile device, such as a smartphone, tablet, laptop, or other device that can utilize wireless networks to download or stream data.

In some embodiments, the Networks 110A-B may be associated with differing bandwidth or other characteristics. For example, in one embodiment, the Network 110A may be a 4G or 3G cellular network with relatively limited bandwidth (and therefore relatively limited download speeds), while the Network 110B is a higher-bandwidth network such as a WiFI connection or a 5G network.

Although two Networks 110A-B are depicted for conceptual clarity, embodiments of the present disclosure can be utilized with any number of discrete networks, including a single network. For example, embodiments of the present disclosure can be used to allow the Streaming Device 105 to respond to dynamic network conditions as it shifts between three or more networks. Similarly, embodiments disclosed herein can be used to allow the Streaming Device 105 to respond to shifting conditions on a single network connection.

In an embodiment, the higher-bandwidth Network 110B may be relatively sporadic or intermittent in that it is not reliably-available to the Streaming Device 105. However, when available, the Network 110B can be used to download significant amounts of data in short times, due to the higher bandwidth. In some embodiments, the Streaming Device 105 can ordinarily download data (e.g., video data) from the Content Server 115 via the Network 110A. In some embodiments, the Streaming Device 105 does so using adaptive bitrate logic to select which bitrate variant to request from the Content Server 115 based, at least in part, on the available bandwidth or download speed via the Network 110A.

In some embodiments, the Streaming Device 105 temporarily buffers this downloaded data in a buffer in memory. The media is then output from that buffer. In many embodiments, the buffer has a relatively limited size. Thus, the Streaming Device 105 typically downloads portions of the data (e.g., media segments) via the Network 110A just before they are needed for output/display.

In an embodiment, if the Streaming Device 105 determines that higher-bandwidth connectivity is available (e.g., via Network 110B), it can dynamically respond to take advantage of these higher speeds. In one embodiment, the Streaming Device 105 determines that this higher speed is available based on determining that the current connection of the device is classified or labeled as a predefined high-speed connection. For example, when connected via the Network 110A, the Streaming Device 105 connectivity may be classified as "4G," while the Network 110G is classified as "5G."

In some embodiments, the Streaming Device 105 identifies the faster connection by evaluating how quickly the data is currently being downloaded from the Content Server 115 or other sources. For example, in one such embodiment, the Streaming Device 105 monitors its current download speed (e.g., for the current segment or portion of data), as well as historical download speeds over a sliding window (e.g., over the last sixty seconds, or over the last ten segments or portions of data). If the current download speed exceeds this historical speed by some predefined criteria, the Streaming Device 105 may determine it is on a high bandwidth connection. In embodiments, this criteria can include a threshold multiplier (e.g., at least twice as fast), a minimum speed (e.g., at least one hundred megabits per second), a threshold increase (e.g., at least fifty megabits per second faster than the historical speed), and the like.

In at least one embodiment, the Streaming Device 105 can identify the high-bandwidth connection based on previous connections. For example, in one such embodiment, the Streaming Device 105 may utilize location services to identify and record its current location whenever the high-bandwidth Network 110G is available. Subsequently, based on the current location or movement of the Streaming Device 105, the Streaming Device 105 may determine that the Network 110B will likely be available at some point in the future (e.g., within ten seconds or some other predefined time). In response, the Streaming Device 105 may begin preparing for the higher-speed connection, as discussed below.

In an embodiment, when the Streaming Device 105 determines that it is using the higher-bandwidth connection, it begins downloading data from the Content Server 115 into an uncapped cache or buffer. In some embodiments, this cache is located in a secondary memory, commonly referred to as "auxiliary memory" or "storage" of the Streaming Device 105 (e.g., a hard drive (HD), solid state drive (SSD), ROM, flash memory, fixed or removable storage media, and the like), while the original buffer is located in primary memory, commonly referred to as "main memory" or in shorthand as simply "memory," of the Streaming Deice 105 (e.g., in random access memory (RAM)). As typically used and known in the art, the term "memory" may refer to what is described herein as "primary memory", while the term "storage" may refer to what is described herein as "secondary memory." Generally, a primary memory is closely coupled with the processing unit(s) of the system (e.g., RAM), allowing for faster access times. However, this direct coupling often requires that the primary memory be relatively limited in size. In contrast, secondary memory typically lacks such direct access, resulting in slower access times, as compared to the primary memory. However, the secondary memory can generally be significantly larger than the primary memory. In another embodiment, if sufficient space is available in primary memory (e.g., in a high-memory system), the Streaming Device 105 may expand the size of the memory buffer, or establish a second buffer or cache in primary memory.

In some embodiments, the Streaming Device 105 downloads data into this cache at the same bitrate that was previously-being used to download the data. For example, if the Streaming Device 105 was originally using a ten megabit per second bitrate stream from the Content Server 115, the Streaming Device 105 will continue to request the ten megabit stream, even though the Network 110B is capable of supporting much higher bitrates.

By downloading this data into the uncapped cache, the Streaming Device 105 can take advantage of the high speed and download additional data beyond that which it otherwise would. For example, rather than buffering a capped amount of data (e.g., the next sixty seconds of video, or the next five segments), the Streaming Device 105 can continue downloading as much of the data as it can into the cache using the faster Network 110B.

In an embodiment, when the original memory buffer is empty (e.g., all of the previously downloaded segments have been output), the Streaming Device 105 will begin outputting data from the cache. This may include transferring the data to memory and outputting it from memory, or outputting it directly from the storage.

In some embodiments, the Streaming Device 105 can continue to download data into the cache (rather than the original buffer) until some predefined criteria is satisfied. This may include determining that the Streaming Device 105 has returned to the original Network 110A. For example, the Streaming Device 105 may check the label or classification of its current connection. In another embodiment, the Streaming Device 105 can continue to monitor download speeds, as discussed above, to detect the drop back to the original connectivity (e.g., by comparing the current speed to a sliding window of historical speeds over the last N segments or seconds).

In one embodiment, the Streaming Device 105 can then continue to output data from the cache until it empties (e.g., until all of the downloaded data has been output). In an embodiment, the Streaming Device 105 can return to the original streaming paradigm (e.g., downloading some amount of data into the buffer) when the cache is nearing empty (e.g., when the amount of data left to be output from the cache is below a predefined threshold).

In some embodiments, the Streaming Device 105 is downloading or streaming from a predefined pool of data. For example, the segments or portions of data may all correspond to a given episode, movie, podcast, or other media. In an embodiment, if the Streaming Device 105 downloads all available data into the cache before the Network 110B is lost (e.g., if the entire episode has been downloaded), it can stop downloading additional data and simply output the data from the cache.

In some embodiments, the Streaming Device 105 may maintain this downloaded cache to allow the Streaming Device 105 to output the media subsequently, even if all network connectivity is lost. In another embodiment, the Streaming Device 105 may allow access to the cache only while the streaming session remains active. In such an embodiment, if the user exits the stream, the Streaming Device 105 may delete the cached data or otherwise mark it as unavailable, and require the Streaming Device 105 to re-stream the media.

In some embodiments, the Streaming Device 105 is configured to download additional data from other streams upon completing a first stream. For example, if the Streaming Device 105 is streaming a given episode from a show, the Streaming Device 105 may begin downloading the next episode if the given episode has completed download. This can allow the Streaming Device 105 to pre-fetch additional data. In an embodiment, the Streaming Device 105 can use any suitable logic to determine which data stream to download. For example, in one embodiment, the Streaming Device 105 or Content Server 115 utilizes a predefined sequence or list of media (e.g., an episode list), and requests/provides the next one. In another embodiment, the Streaming Device 105 or Content Server 115 uses other customization logic used to suggest media to users in order to select the next data for download.

In at least one embodiment, the Streaming Device 105 can track whether pre-downloaded media was actually consumed. In some embodiments, the Streaming Device 105 does so by monitoring which data or segments were actually output from the cache. The Streaming Device 105 may transmit this information to the Content Server 115 or other systems. This allows the Content Server 115 (or other systems) to remember where the user left off in a given stream based on the media that was actually output, as opposed to based solely on the data that was downloaded. Similar logic can be applied to embodiments where the Streaming Device 105 pre-fetches subsequent episodes or media.

In some embodiments, the Streaming Device 105 can pre-fetch other defined media in addition to or instead of downloading media from the stream into the cache. For example, the Streaming Device 105 may use the high-bandwidth Network 110B to download advertisements or other predefined media into the cache, in addition to or instead of pre-fetching segments of the requested media. This may allow the Streaming Device 105 to seamlessly output this data. For example, in a live-streaming environment, there may be no media that can be pre-downloaded into the cache. However, the Streaming Device 105 may use the high-bandwidth connection to pre-download advertisements or other media into the cache. This data can then be output appropriately later. In an embodiment, the Streaming Device 105 can monitor which advertisements or other media were actually output/consumed, and transmit this information to the Content Server 115 or other systems.

In at least one embodiment, the Streaming Device 105 can selectively use the high-bandwidth Network 110B to download other data or variants that would not otherwise be downloaded. For example, although the Streaming Device 105 is streaming data at a first bitrate on the original connection, the Streaming Device 105 may stream one or more segments at a higher bitrate into the cache when the Network 110B is available. As another example, if the Streaming Device 105 is streaming audio-only media, the Streaming Device 105 may download some associated video into the cache when the high-bandwidth connection is available.

In some embodiments, as the Streaming Device 105 downloads data into the cache, the cache is allowed to grow or expand as needed. That is, the cache is uncapped. For example, although some initial size may be defined when the cache is created, the Streaming Device 105 can allow the cache to grow as data is downloaded, until some predefined maximum has been reached or until the storage has run out of space. By utilizing uncapped buffers for the sporadic high-bandwidth connectivity, the Streaming Device 105 can improve the streaming environment significantly.

Figure 2:
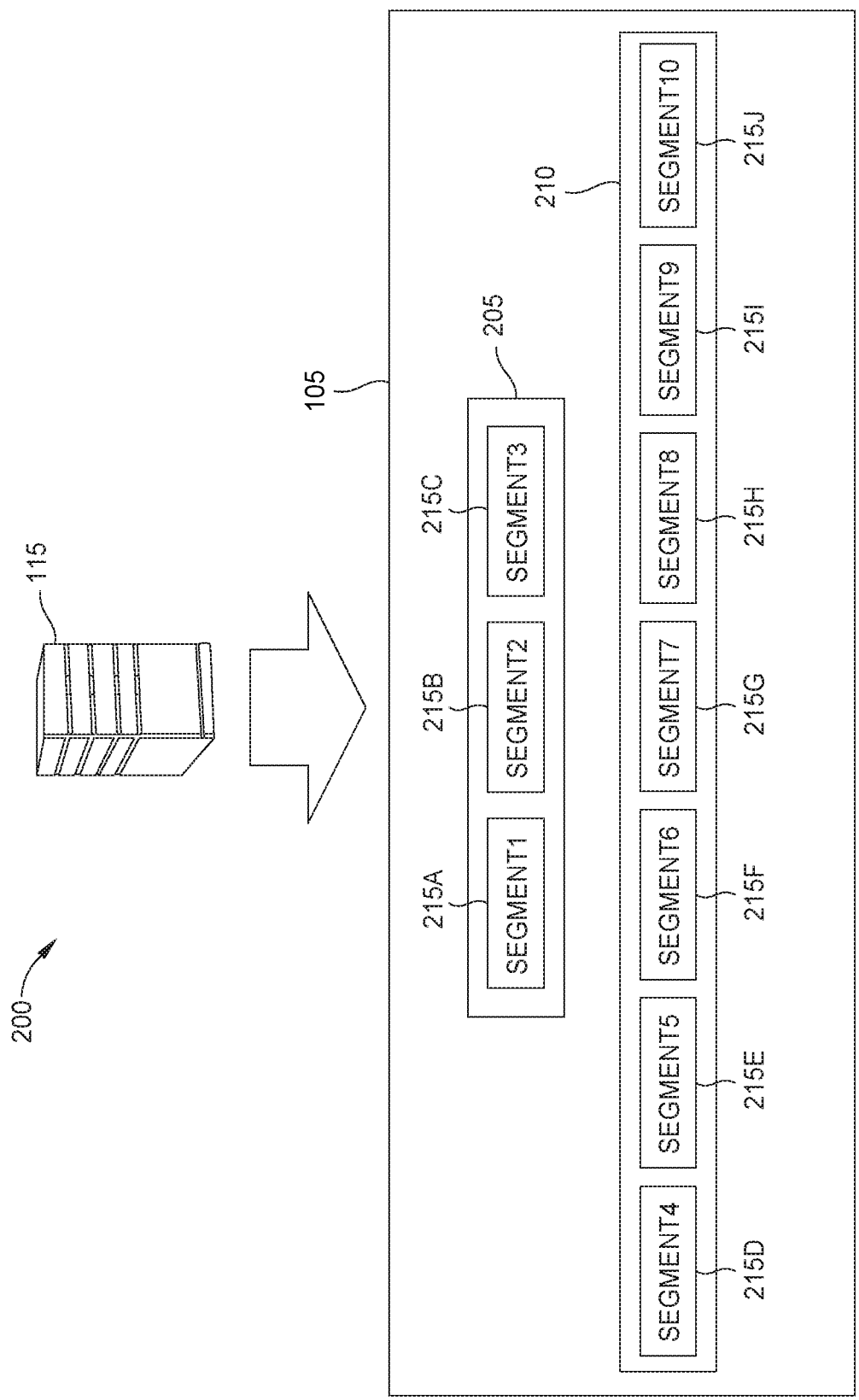
FIG. 2 depicts a system including a streaming device configured to utilize buffers and caches to dynamically buffer data over network connections with dynamic bandwidth, according to some embodiments disclosed herein.

FIG. 2 depicts a system 200 including a Streaming Device 105 configured to utilize buffers and caches to dynamically buffer data over network connections with dynamic bandwidth, according to some embodiments disclosed herein. In the illustrated embodiment, the Streaming Device 105 downloads media Segments 215 from a Content Server 115. As illustrated, these Segments 215 are sequential portions of data in a predefined media stream, and are downloaded and outputted in sequence.

In the illustrated embodiment, the Streaming Device 105 includes a Buffer 205 and a Cache 210. In at least one embodiment, the Buffer 205 is located in memory, while the Cache 210 is located in storage. In some embodiments, the Cache 210 may simply correspond to additional space in memory. In still another embodiment, the Cache 210 is not a discrete data structure, but is implemented by expanding the cap on the Buffer 205.

In one embodiment, the Buffer 205 has a limited (typically fixed) size. In the illustrated embodiment, the Buffer 205 is configured to store three Segments 215. In some embodiments of the present disclosure, the Cache 210 is larger and is configured to store additional data. In the illustrated embodiment, the Cache 210 stores seven Segments 215. In at least one embodiment, the Cache 210 can be dynamically expanded as data is downloaded. For example, if a high-bandwidth connection remains available after the cache is full, the Streaming Device 105 may expand the cache to allow it to grow and store more Segments 215.

In embodiments, the Streaming Device 105 may download Segments 215 into the Buffer 205 during normal use. As Segments 215 are output from the Buffer 205, they are deleted or otherwise marked as "consumed," allowing the Streaming Device 105 to download a subsequent Segment 215 into the Buffer 205. In the illustrated embodiment, upon determining that a high-bandwidth connection is available, the Streaming Device 105 begins downloading subsequent Segments 215 into the Cache 210. That is, the Streaming Device 105 can download Segments 215 that have not already been fetched (regardless of whether they have been output) to the Cache 210, rather than the Buffer 205.

Once the last Segment 215 in the Buffer 205 has been output (Segment 215C in the illustrated embodiment), the Streaming Device 105 begins outputting subsequent Segments 215 from the Cache 210. In some embodiments, this includes transferring the Segments 215 sequentially from the Cache 210 into the Buffer 205 or to another portion of memory, and then outputting them from memory.

In an embodiment, as long as the high-bandwidth connection remains available, the Streaming Device 105 continues to download Segments 215 to the Cache 210. If the high-bandwidth connection is no longer available and the Streaming Device 105 reverts to using the initial connection, the Streaming Device 105 can pause downloading until all (or nearly all) of the data in the Cache 210 is consumed.

For example, when the Streaming Device 105 determines that some predefined amount of data in the Cache 210 remains (e.g., three more Segments 215 to be output), the Streaming Device 105 can initiate the original streaming process to download subsequent Segments 215 into the Buffer 205. If the high-bandwidth connection becomes available once again, the Streaming Device 105 can again begin downloading data to the Cache 210. This allows the Streaming Device 105 to seamlessly transition between connections with differing bandwidth/speed.

Figure 3:
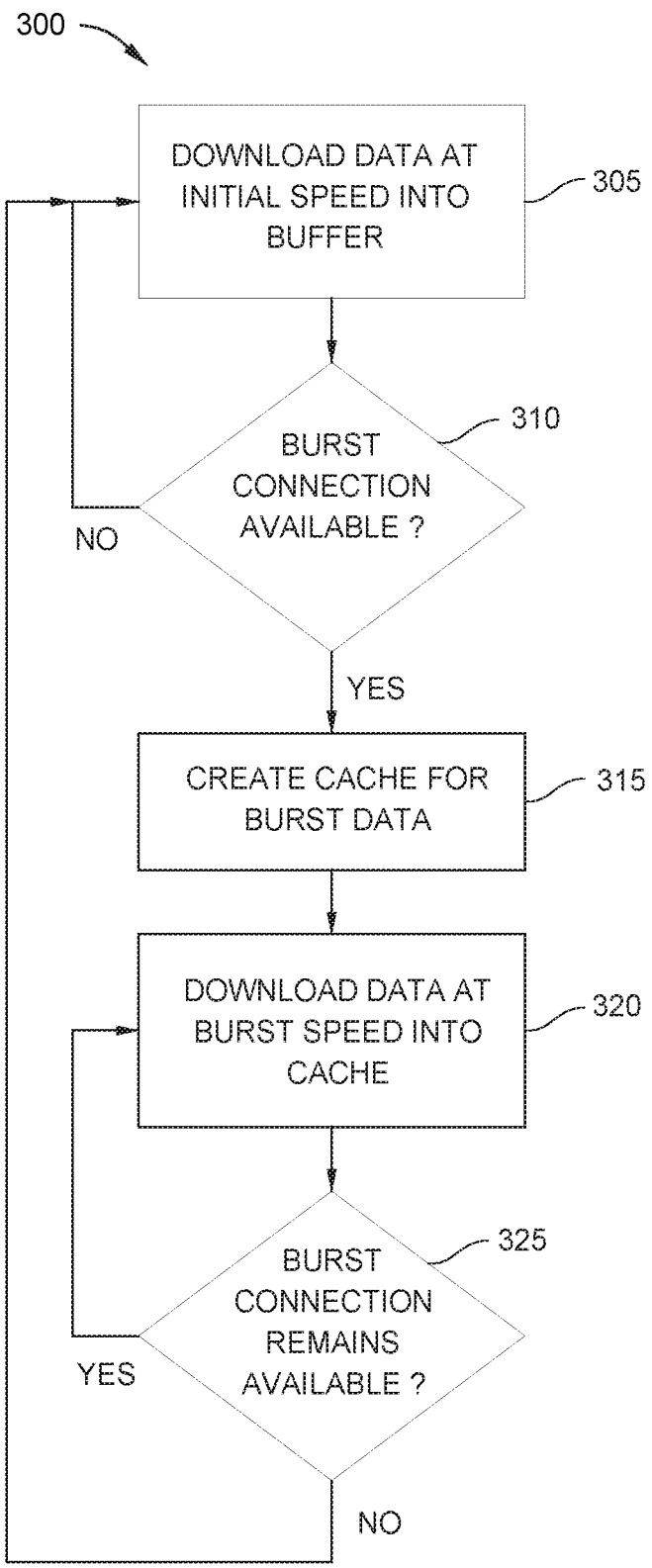
FIG. 3 is a flow diagram illustrating a method of dynamically responding to shifting network connectivity, according to some embodiments disclosed herein.

FIG. 3 is a flow diagram illustrating a method 300 of dynamically responding to shifting network connectivity, according to some embodiments disclosed herein. In one embodiment, the method 300 is performed by a streaming device (such as the Streaming Device 105). The method 300 begins at block 305, where the streaming device downloads data (e.g., media segments) at some initial speed into a buffer (e.g., in memory). For example, the streaming device may be streaming segments into a buffer via a first wireless connection associated with a first bandwidth/speed. In some embodiments, the streaming device is further downloading data associated with an initial bitrate (e.g., a ten megabit stream).

The method 300 then continues to block 310, where the streaming device determines whether a burst connection is available. In embodiments, the burst connection is a relatively higher-bandwidth or higher-speed connection that becomes available to the streaming device. For example, the burst connection may correspond to a 5G connection. In another embodiment, the burst connection may correspond to faster download speeds on the same original connection.

In one embodiment, the streaming device determines whether burst connectivity is available based on the label or classification indicated by the current connectivity. In another embodiment, the streaming device compares the current or most-recent download speed to historical download speed (e.g., over the previous five segments or sixty seconds). If the current speed exceeds some predefined threshold, as compared to the original speed (or in the abstract, without comparison to the initial speed), the streaming device can determine that burst connectivity is available.

If no burst connectivity is available, the method 300 returns to block 305. In this way, the streaming device continues to stream data through the buffer, as normal. If the streaming device determines that burst connectivity is available, the method 300 continues to block 315, where the streaming device creates a cache to be used to download data via the burst connectivity (or determines to begin using a pre-existing cache). In one embodiment, this includes allocating some portion of memory or storage for the data. In an embodiment, the cache is larger than the buffer (or will be uncapped and allowed to grow as needed).

The method 300 then continues to block 320, where the streaming device begins downloading data (e.g., subsequent segments of the media) into the cache using the burst connectivity. In embodiments, because the burst connectivity is associated with higher speeds or bandwidth, the streaming device can download additional segments immediately, rather than waiting until just before they are needed for output. In at least one embodiment, the streaming device continues to download data associated with the same stream or bitrate. That is, if the streaming device was downloading a given stream, variant, or bitrate, the streaming device can continue to use the same stream, variant, or bitrate when downloading into the cache. This allows the streaming device to transition seamlessly back and forth between the buffer and cache (and between the initial connection and the burst connection).

At block 325, the streaming device determines whether the burst connection is still available. If so, the method 300 returns to block 320. In this way, the streaming device can continue to download data at the higher speed until the burst connectivity is no longer available, or some other criteria is satisfied. As discussed above, this criteria can include determining whether the entire media (e.g., the whole show) has been downloaded, and the like. In at least one embodiment, the streaming device may be entitled to download some predefined maximum amount of data into the cache. For example, based on licensing or some other criteria, the streaming device may be allowed to pre-download some predefined amount of data (e.g., up to fifty segments or ten minutes).

Returning to block 325, if the streaming device determines that burst connectivity is no longer available, the method 300 returns to block 305 to stream data into the buffer using the initial connectivity. In at least one embodiment, rather than immediately begin streaming at the initial rate, the streaming device may wait until the cache is empty (or nearly empty), as discussed above.

Advantageously, the method 300 allows the streaming device to transition smoothly between different modes of connectivity while taking full advantage of temporary burst connectivity to pre-download data to a cache.

Figure 4:
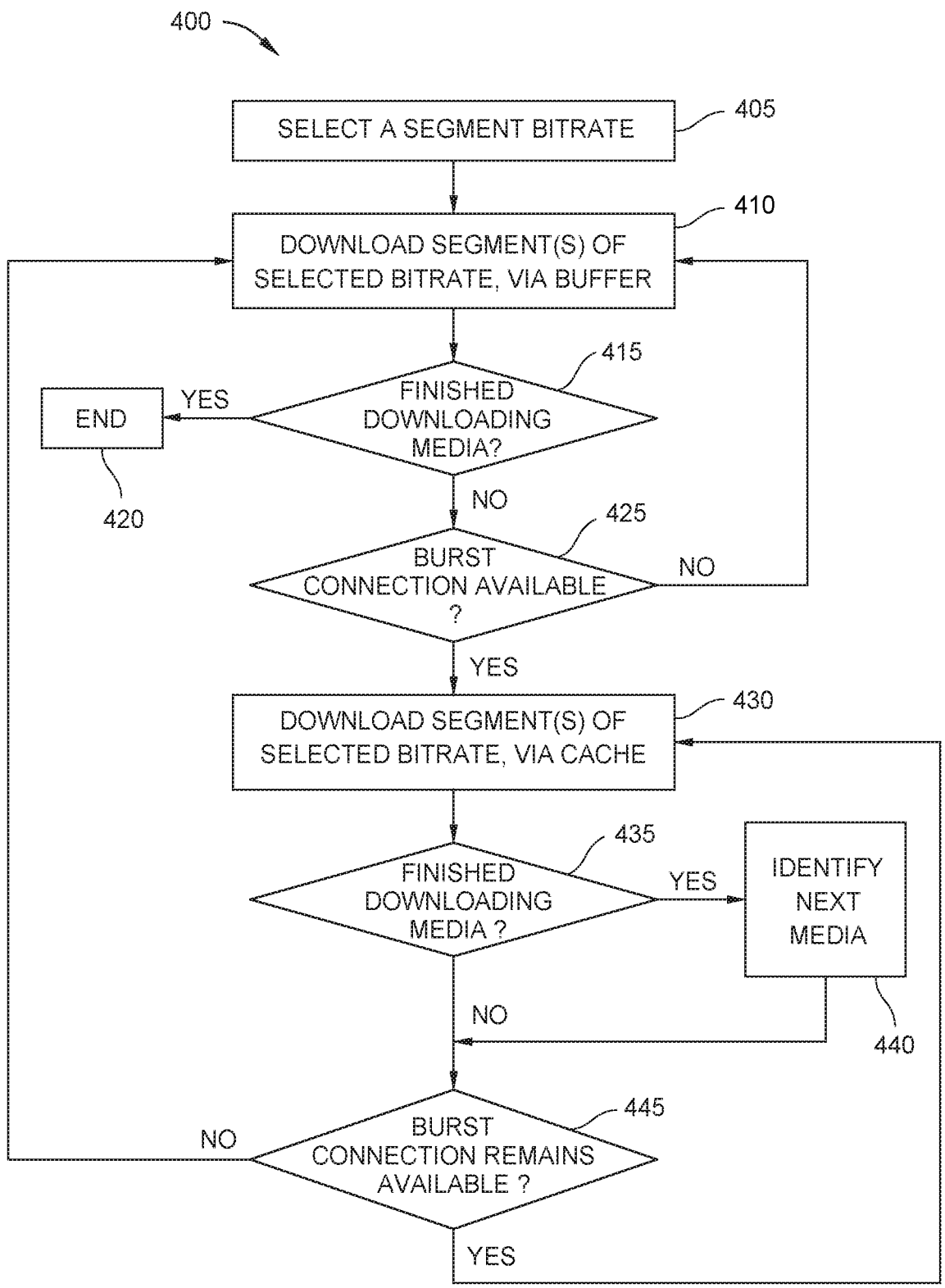
FIG. 4 is a flow diagram illustrating a method for streaming media segments over dynamic network conditions, according to some embodiments disclosed herein.

FIG. 4 is a flow diagram illustrating a method 400 for streaming media segments over dynamic network conditions, according to some embodiments disclosed herein. In one embodiment, the method 400 is performed by a streaming device (e.g., the Streaming Device 105). In an embodiment, the method 400 corresponds to streaming media segments specifically (as compared to more generic data), and provides additional detail for such an embodiment. The method 400 begins at block 405, where the streaming device selects a segment bitrate for streaming.

For example, using adaptive bitrate logic, the streaming device can determine which bitrate to utilize based, in part, on the available bandwidth or current download speed at the streaming device. As used herein, a given bitrate may alternatively be referred to as a "variant," a "stream," and the like. In embodiments, selecting a bitrate comprises selecting a particular version or variant of the media to be downloaded. Although higher bitrates are often associated with higher quality video/audio, they also require higher bandwidth to reliably download. Thus, the streaming device can select a bitrate that ensures reliable streaming at the highest quality possible.

At block 410, the streaming device downloads segment(s) of the media associated with the selected bitrate into a buffer. As discussed above, these buffered segments are then output sequentially. At block 415, the streaming device determines whether it has finished downloading the media. For example, if the streaming device is streaming a movie, the streaming device may determine whether the last media segment in the movie has been downloaded. If so, the method 400 terminates at block 420. That is, in the illustrated embodiment, this way, the streaming device will cease downloading when it has finished the current stream if it is still using the initial connection.

If the streaming device determines that it has not finished streaming the media, the method 400 continues to block 425. At block 425, the streaming device determines whether a burst connection is available, as discussed above. If burst connectivity is not available, the method 400 returns to block 410. In this way, the streaming device can continue to stream data at the initial selected bitrate via the initial connectivity. If the streaming device determines that burst connectivity is available, the method 400 continues to block 430.

At block 430, the streaming device downloads subsequent segment(s) of the media into a cache. In an embodiment, this cache may be located in storage or any suitable location. The cache may be larger than the buffer, associated with an uncapped or unrestricted size, or both. In the illustrated embodiment, although these segments may be downloaded at a higher download speed (due to the higher bandwidth of the burst connection), the streaming device continues to download segments for the same bitrate/variant. This ensures that, if the burst connectivity is suddenly lost (e.g., due to its transient and unstable nature), the subsequent segments can be downloaded using the original connection without interruption.

At block 435, the streaming device determines whether it has finished downloading the selected media (e.g., the episode or movie that is being streamed). If not, the method 400 continues to block 445. If the streaming device has finished downloading the current media, the method 400 proceeds to block 440, where the streaming device identifies the next media. In one embodiment, the streaming device does so by querying the content server or provider. The content server can then determine which media should be streamed next (e.g., using a defined sequence of media, using predictive algorithms to suggest media to the user, and the like). This allows the streaming device to pre-cache media for the next stream that the user may wish to view. The method 400 then continues to block 445.

At block 445, the streaming device determines whether the burst connectivity is still available. If so, the method 4000 returns to block 430 to continue downloading segments into the cache at the increased speed. If the burst connectivity is no longer available, the method 400 returns to block 410 to continue streaming using the original connection. In at least one embodiment, as discussed above, the streaming device may pause downloading until the cache has been consumed.

Additionally, in some embodiments, if the streaming device had begun downloading a separate media stream (e.g., the next episode in a series), the method 400 may terminate, rather than continuing to download segments from the next media, unless the streaming device has begun actually consuming the next media. That is, unless the user has finished the first media and begun outputting the second, the streaming device will not continue downloading the second media on the initial connectivity.

Figure 5:
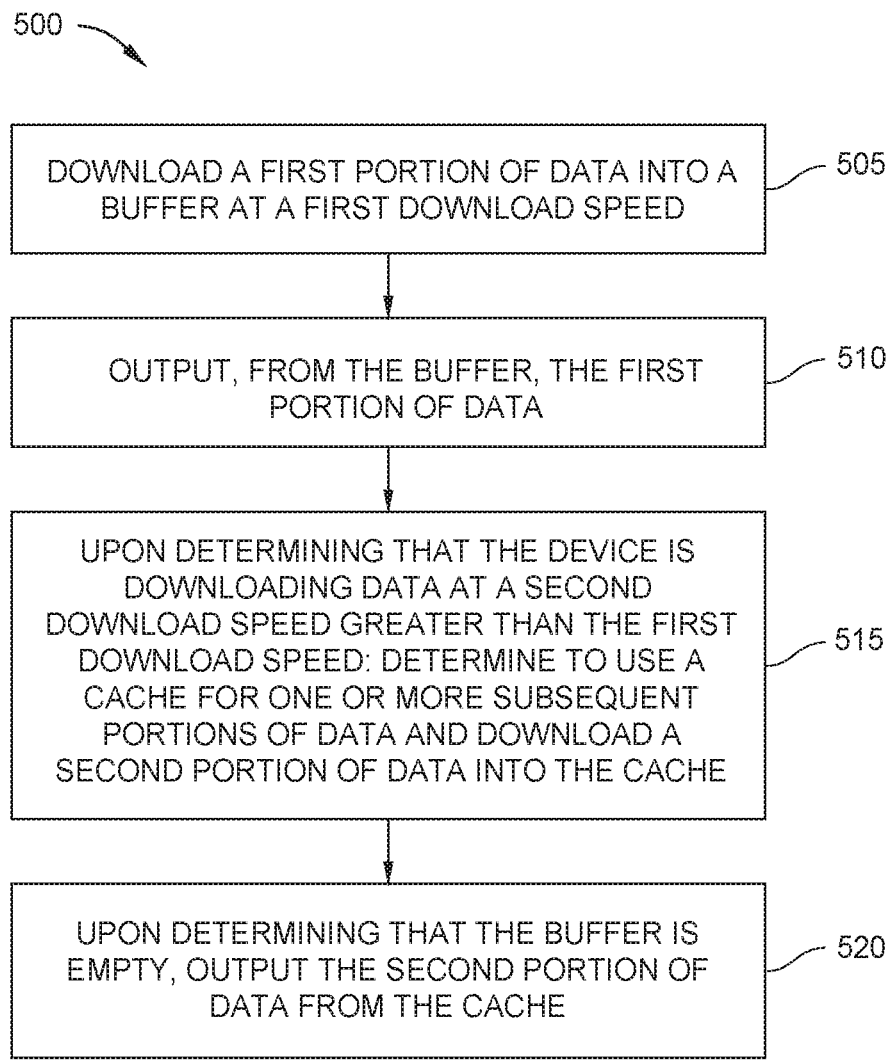
FIG. 5 is a flow diagram illustrating a method for downloading data over dynamic network conditions, according to some embodiments disclosed herein.

FIG. 5 is a flow diagram illustrating a method 500 for downloading data over dynamic network conditions, according to some embodiments disclosed herein. The method 500 begins at block 505, where a device (e.g., a Streaming Device 105), downloads a first portion of data into a buffer at a first download speed. At block 510, the device outputs, from the buffer, the first portion of data. The method 500 then continues to block 515, where upon determining that the device is downloading data at a second download speed greater than the first download speed, the device determines to use a cache for one or more subsequent portions of data and downloads a second portion of data into the cache. At block 520, upon determining that the buffer is empty, the device outputs the second portion of data from the cache.

Figure 6A:
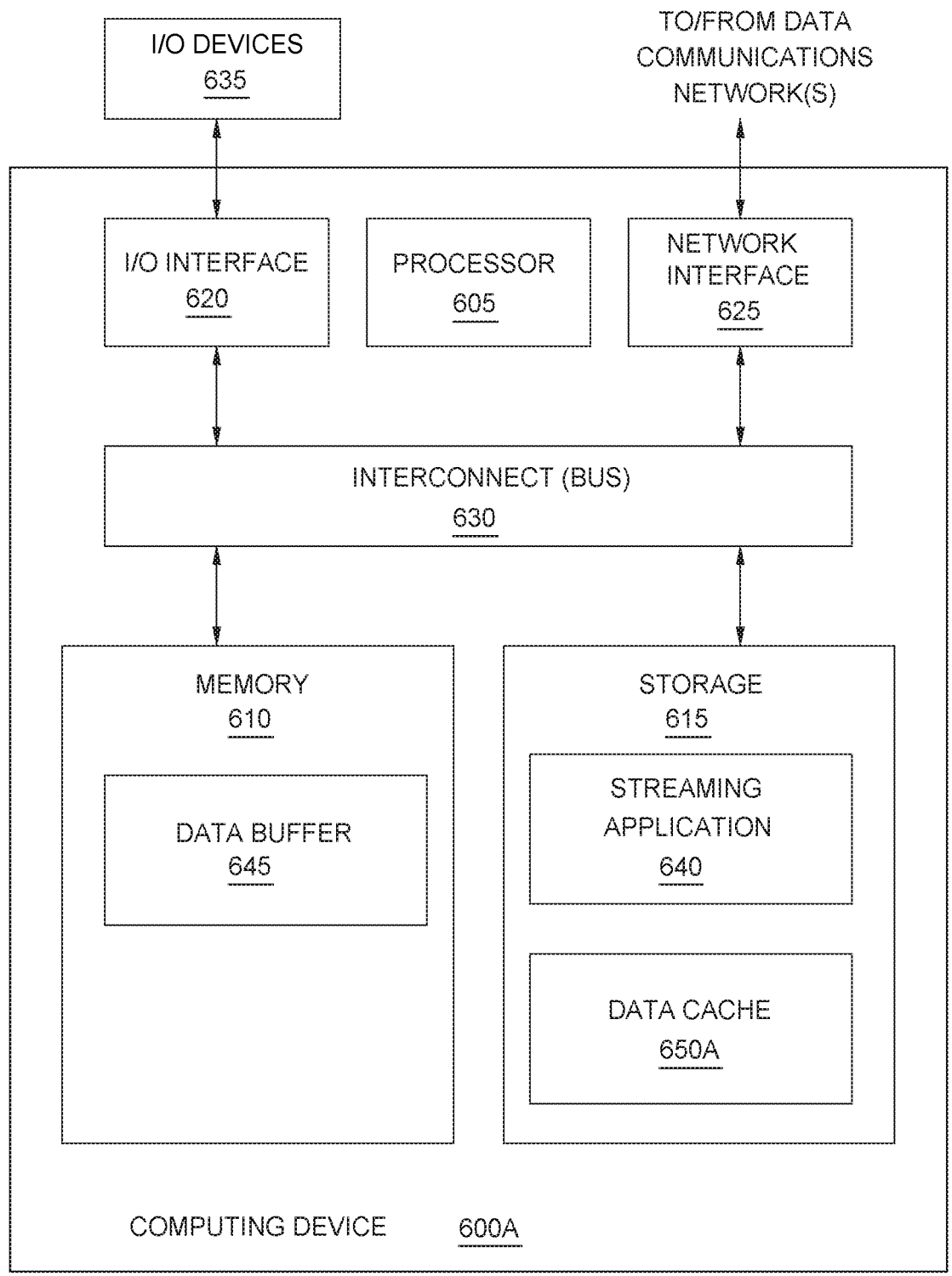
FIGS. 6A and 6B are block diagrams of a computing device configured to stream data over dynamic network conditions, according to some embodiments disclosed herein.

FIG. 6A is a block diagram of a Computing Device 600A configured to stream data over dynamic network conditions, according to some embodiments disclosed herein. In one embodiment, the Computing Device 600A is a Streaming Device 105. Although depicted as a physical device, in embodiments, the Computing Device 600A may be implemented as a virtual device or service, or across a number of devices (e.g., in a cloud environment). As illustrated, the Computing Device 600A includes a Processor 605, Memory 610, Storage 615, I/O Interface 620, and a Network Interface 625. In the illustrated embodiment, the Processor 605 retrieves and executes programming instructions stored in Memory 610, as well as stores and retrieves application data residing in Storage 615. The Processor 605 is generally representative of a single CPU, a GPU, a CPU and a GPU, multiple CPUs, multiple GPUs, a single CPU or GPU having multiple processing cores, and the like. The Memory 610 is generally included to be representative of a random access memory. Storage 615 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 635 (such as a mouse, a keyboard, a monitor, a touchscreen, etc.) are connected via the I/O Interface(s) 620. Further, via the Network Interface 625, the Computing Device 600A can be communicatively coupled with one or more other devices and components (directly or indirectly), such as content servers, via one or more networks.

In the illustrated embodiment, the Storage 615 includes a Data Cache 650A. In embodiments, the Data Cache 650A is generally used to store portions of data that are downloaded at a burst speed, as discussed above. In some embodiments, the Data Cache 650A is unbounded, in that it can be expanded to store any amount of data. For example, as long as the burst connection is available, the Computing Device 600A may continue to download segments into the Data Cache 650A, growing it as needed.

As illustrated, the Memory 610 includes a Data Buffer 645. A Streaming Application 640 is depicted as residing in Storage 615. Although depicted as software, in embodiments, the functionality of the Streaming Application 640 may be implemented using hardware, software, or a combination of hardware and software. The Memory 610 may be used to temporarily store the Streaming Application 640 while the processor executes the instructions of the Streaming Application 640 during runtime. In an embodiment, the Data Buffer 645 is fixed in size. The Streaming Application 640 is generally configured to perform one or more embodiments disclosed herein. For example, the Streaming Application 640 may stream data (e.g., from a content server) into the Data Buffer 645 when ordinary connectivity is available. When burst speeds are available, the Streaming Application 640 may begin streaming data into the Data Cache 650A.

Figure 6B:
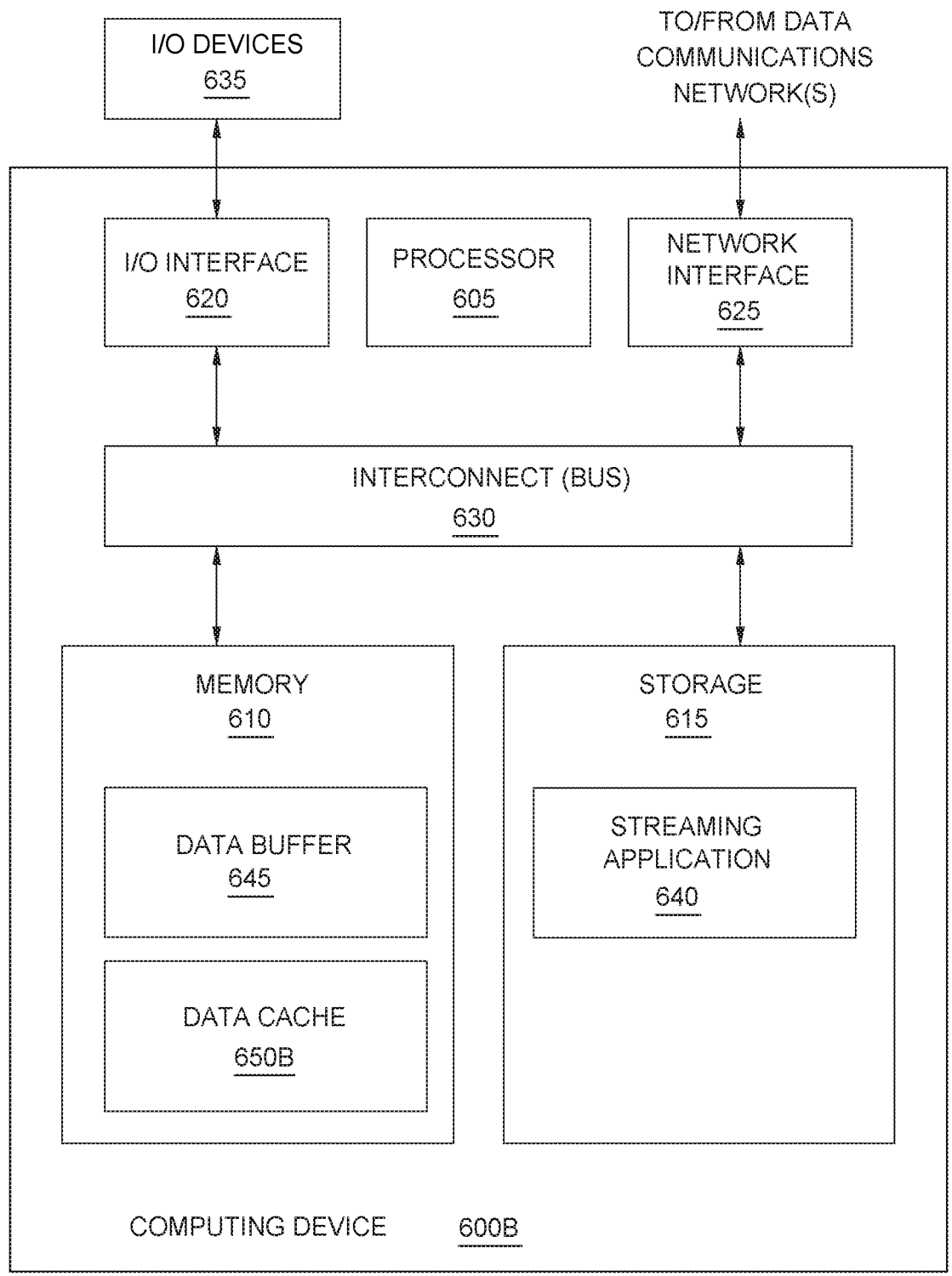

FIG. 6B is a block diagram of an alternative Computing Device 600B configured to stream data over dynamic network conditions, according to some embodiments disclosed herein. In the illustrated embodiment, rather than using the Storage 615 to host the cache, the Computing Device 600B include both the Data Buffer 645 and the Data Cache 650B in Memory 610. In one embodiment, the Streaming Application 640 can stream data into the Data Buffer 645 as discussed above. When burst speeds are available, in the illustrated embodiment, the Streaming Application 640 streams data into the Data Cache 650B in Memory 610. That is, rather than allocate a cache in Storage 615, the system allocates a cache in Memory 610. In at least one embodiment, rather than allocate a separate Data Cache 650B, the Streaming Application 640 can instead expand the size of the Data Buffer 645 as new data is downloaded at the burst speed.

In one embodiment, the Streaming Application 640 downloads data into the Data Cache 650B until the burst connectivity is no longer available. In some embodiments, if the Data Cache 650B reaches a predefined size (that is, if a predefined amount of data has already been downloaded into the Data Cache 650B), the Streaming Application 640 can allocate another cache in Storage 615 to continue to download data.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   downloading, by a device, a first portion of data into a buffer at a first download speed;
   outputting, from the buffer, the first portion of data;
   upon determining that the device is downloading data at a second download speed greater than the first download speed:
      determining to use a cache for one or more subsequent portions of data; and
      downloading a second portion of data into the cache; and
   upon determining that the buffer is empty, outputting the second portion of data from the cache.

2. The method of claim 1, the method further comprising:
   upon determining that the device is no longer downloading data at the second download speed:
      downloading a third portion of data into the buffer.

3. The method of claim 1, wherein the first and second portions of data are of a plurality of portions of data associated with a first data stream, the method further comprising:
   upon determining that the device is downloading data at the second download speed, downloading all subsequent portions of data from the plurality of portions of data into the cache.

4. The method of claim 3, the method further comprising:
   upon determining all of the plurality of portions of data have been downloaded to the cache:
      identifying a second data stream based at least in part on the first data stream; and
      downloading at least one portion of data associated with the second data stream into the cache.

5. The method of claim 1, wherein the device downloads the first portion of data using a first network, and wherein determining that the device is downloading data at the second download speed comprises determining that the device has begun downloading data using a second network.

6. The method of claim 1, wherein determining that the device is downloading data at the second download speed comprises determining that the second download speed exceeds a predefined threshold, as compared to the first download speed.

7. The method of claim 6, wherein determining that the second download speed exceeds a predefined threshold comprises comparing the second download speed against historical download speeds using a sliding window.

8. The method of claim 1, wherein the second portion of data is downloaded into the cache at the second download speed, and wherein the first portion of data and the second portion of data are both associated with a first bitrate of a plurality of bitrates.

9. A non-transitory computer-readable medium containing computer program code that, when executed by operation of one or more computer processors, performs an operation comprising:
   downloading, by a device, a first portion of data into a buffer at a first download speed;
   outputting, from the buffer, the first portion of data;
   upon determining that the device is downloading data at a second download speed greater than the first download speed:
      determining to use a cache for one or more subsequent portions of data; and
      downloading a second portion of data into the cache; and
   upon determining that the buffer is empty, outputting the second portion of data from the cache.

10. The computer-readable medium of claim 9, the operation further comprising:
    upon determining that the device is no longer downloading data at the second download speed:
       downloading a third portion of data into the buffer.

11. The computer-readable medium of claim 9, wherein the first and second portions of data are of a plurality of portions of data associated with a first data stream, the operation further comprising:
    upon determining that the device is downloading data at the second download speed, downloading all subsequent portions of data from the plurality of portions of data into the cache.

12. The computer-readable medium of claim 11, the operation further comprising:
    upon determining all of the plurality of portions of data have been downloaded to the cache:
       identifying a second data stream based at least in part on the first data stream; and
       downloading at least one portion of data associated with the second data stream into the cache.

13. The computer-readable medium of claim 9, wherein the device downloads the first portion of data using a first network, and wherein determining that the device is downloading data at the second download speed comprises determining that the device has begun downloading data using a second network.

14. The computer-readable medium of claim 9, wherein determining that the device is downloading data at the second download speed comprises determining that the second download speed exceeds a predefined threshold, as compared to the first download speed.

15. A system, comprising:
    one or more computer processors; and
    a storage medium containing a program which when executed by the one or more computer processors performs an operation, the operation comprising:
       downloading, by the system, a first portion of data into a buffer at a first download speed;
       outputting, from the buffer, the first portion of data;
       upon determining that the system is downloading data at a second download speed greater than the first download speed:
          determining to use a cache for one or more subsequent portions of data; and
          downloading a second portion of data into the cache; and
       upon determining that the buffer is empty, outputting the second portion of data from the cache.

16. The system of claim 15, the operation further comprising:

upon determining that the system is no longer downloading data at the second download speed:
    downloading a third portion of data into the buffer.

17. The system of claim 15, wherein the first and second portions of data are of a plurality of portions of data associated with a first data stream, the operation further comprising:
    upon determining that the system is downloading data at the second download speed, downloading all subsequent portions of data from the plurality of portions of data into the cache.

18. The system of claim 17, the operation further comprising:
    upon determining all of the plurality of portions of data have been downloaded to the cache:
        identifying a second data stream based at least in part on the first data stream; and
        downloading at least one portion of data associated with the second data stream into the cache.

19. The system of claim 15, wherein the system downloads the first portion of data using a first network, and wherein determining that the system is downloading data at the second download speed comprises determining that the system has begun downloading data using a second network.

20. The system of claim 15 further comprising a memory, wherein the buffer is an allocated portion of the memory, and wherein the cache is an allocated portion of the storage medium.

* * * * *

UNITED STATES PATENT AND TRADEMARK OFFICE
CERTIFICATE OF CORRECTION

PATENT NO. : 11,178,198 B1  
APPLICATION NO. : 17/089317  
DATED : November 16, 2021  
INVENTOR(S) : Nikita I. Tkachov Page 1 of 1

It is certified that error appears in the above-identified patent and that said Letters Patent is hereby corrected as shown below:

On the Title Page

Item (74), in Column 2, in "Attorney, Agent, or Firm", Line 1, delete "Shendan," and insert -- Sheridan, --, therefor.

In the Specification

In Column 3, Line 44, delete "1106" and insert -- 110B --, therefor.

In Column 3, Line 67, delete "1106" and insert -- 110B --, therefor.

In Column 4, Line 3, delete "1108" and insert -- 110B --, therefor.

In Column 4, Line 42, delete "1108" and insert -- 110B --, therefor.

In Column 5, Line 17, delete "1108" and insert -- 110B --, therefor.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*